United States Patent [19]

Baert et al.

[11] Patent Number: 5,074,896
[45] Date of Patent: Dec. 24, 1991

[54] CARTRIDGE DEVICE FOR GAS FILTRATION

[76] Inventors: Jacques Baert, 5, Rue Galltiff, 77380 Combs-la-Ville; Loïc Gautier, 1, Square Helene Boucher, 91070 Bondoufle; Hervé H. Brel, 26, Rue Soljenitsine, 91000 Evry; Bruno Thuillier, 11, Rue Mendes-France, 91700 Sainte-Genevieve-des-Bois; Maria Bianco, 11, Grande Rue, 91100 Corbeil sur Essonne, all of France

[21] Appl. No.: 634,659

[22] Filed: Dec. 27, 1990

[51] Int. Cl.⁵ .............................................. B01D 46/02
[52] U.S. Cl. .................................... 55/341.6; 55/379; 55/381; 55/501; 55/508
[58] Field of Search ....................... 55/341.6, 364, 502, 55/378-381, 508, 528, DIG. 31, 501

[56] References Cited
U.S. PATENT DOCUMENTS

| | | |
|---|---|---|
| 3,160,908 | 12/1964 | Peabody et al. ................... 55/379 X |
| 3,289,395 | 12/1966 | Getzin ................................ 55/381 X |
| 3,475,884 | 11/1969 | Kulzer . |
| 3,552,104 | 1/1971 | Wood ...................................... 55/502 |
| 3,830,042 | 8/1974 | MacDonnell ..................... 55/381 X |
| 3,951,628 | 4/1976 | Eskijian ............................ 55/508 X |
| 4,220,459 | 9/1980 | Hammond et al. ................ 55/379 X |
| 4,272,267 | 6/1981 | Kamps et al. ............. 55/DIG. 31 X |
| 4,306,896 | 12/1981 | O'Dell ............................... 55/379 X |
| 4,877,453 | 10/1989 | Oshitari ............................. 55/528 X |

FOREIGN PATENT DOCUMENTS

| | | |
|---|---|---|
| 219554 | 3/1985 | European Pat. Off. . |
| 337061 | 2/1989 | European Pat. Off. . |
| 2543931 | 2/1975 | Fed. Rep. of Germany . |
| 255947 | 7/1948 | Switzerland . |

Primary Examiner—Charles Hart
Attorney, Agent, or Firm—Gary A. Samuels

[57] ABSTRACT

A gas filtration device embodying in a frame a multiplicity of elongated porous polytetrafluoroethylene membrane filter pouches supported within by individual frames and without by a cradle. Useful for air filtration as a cartridge filter.

13 Claims, 3 Drawing Sheets

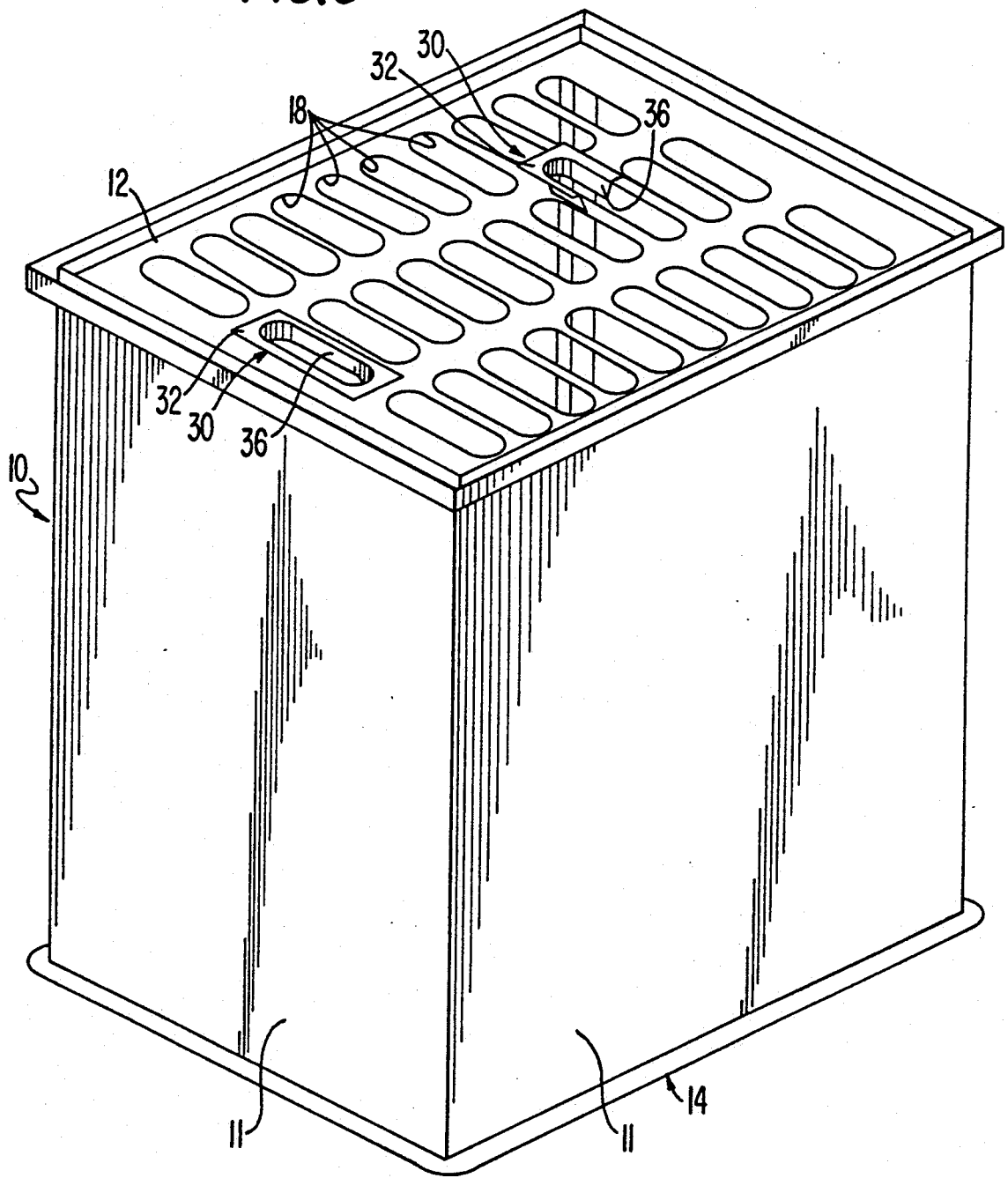

CARTRIDGE DEVICE FOR GAS FILTRATION

FIELD OF THE INVENTION

The invention pertains generally to the field of gas filtration and particularly to the filtration of air for its purification.

BACKGROUND OF THE INVENTION

Air purification filters frequently appear in the form of cartridges containing a metallic framework, generally having parallelopiped contours, on which a filtration means is attached.

Conventionally, such a filtering means may consist of a honeycomb filtration unit structure according to which a single semi-rigid membrane of a filtration material is shaped by folding in such a manner as to present a large number of juxtaposed filtration pockets.

However, such a known cartidge filter presents a certain number of disadvantages. In particular, the numerous folds and corners produced during the shaping of the honeycomb constitute traps for the dust or other particles extracted from the air. Thus, when the filter is cleaned, such as by reversal of the air flux passing through the filter and recovery of the dust separated from the membrane, the clogging of certain regions is such that the cleaning of the filter in these regions turns out to be impossible.

A second disadvantage of the known honeycombed cartridge filters lies in the fact that deterioration of the filtering material necessitates the replacement of the entire cartridge. This solution obviously is even more costly as the price of the filtration material increases.

Finally, the honeycomb structures, which require special shaping machines, add to the overall resale cost of such cartridge filters.

There is further known, e.g. from Swiss patent No. 255 947, U.S. Pat. No. 3,475,884 and European Patent No. 0 219 554 a filtering device wherein a plurality of filtration pouches are fixed removably to a plate or the like having a pluarality of openings for said pouches and fixed inside the filtering device.

Although good filtration efficiency may be attained with such device, it suffers from various drawbacks. First of all, the removal of a filtration pouch is difficult since it is necessary to operate inside the filtering device. There is also a risk in such operation that the clean side of the device gets polluted because of dirt separating from the pouch on which it has built up. Finally, such known structures need complicated holding arrangements at the closed end of the pouches, in order to keep them in parallel, spaced-apart relationship. Such holding arrangements make the dismounting of a pouch still more difficult.

SUMMARY OF THE INVENTION

The present invention seeks to overcome the disadvantages of the earlier techniques and proposes a cartridge filter which is simple and economical to construct, whose cleaning is extremely easy and effective, and whose maintenance time and costs are minimized in case of the failure of the filtering material.

The present invention provides a gas filtration cartridge for removable insertion into a filtration device, comprising:

(a) a self-supporting framework;

(b) a plate comprising part of the framework and provided at one end thereof, said plate containing a multiplicity of openings;

(c) a multiplicity of spaced-apart elongated individual filtration pouches extending substantially parallel to one another within the framework from the respective openings of said plate;

(d) means for sealed connection of each pouch through an open end onto an associated opening of the plate; and (e) means for attachment provided on the framework at an end opposite the plate to hold the pouches in their parallel relationship.

Preferred, but non-limiting, aspects of the device according to the invention are the shape of the openings, that the transverse cross-section of the pouches is substantially oblong, and a frame for maintaining the shape is provided in the interior of each pouch.

The means for a sealed connection contains a platen in association with each pouch which contains a collar engaged with the open end of the pouch and with the associated opening. The pouch material in the region of its open end is secured between the platen and the edge of the opening during placement into position of the platen on the plate. The pouch material in the region of its open end is held between the exterior face of the collar and the associated edge of the opening. The pouch contains a flange at the level of its open end, which is held between a plate of the platen and the framework and projects toward the exterior with respect to the base of the collar and the plate. The collar of each platen presents a layer of elastically deformable material on its exterior face. The means for holding contain a cradle support in association with each pouch in order to receive the closed end of the pouch and the associated end of the frame. A multiplicity of cradle supports, corresponding to a multiplicity of pouches arranged in a single row, are defined by a rigid coiled wire. The filtering pouches are constructed from a filtering membrane of porous polytetrafluoroethylene. The edge of each opening of the plate contains an element for protection of the pouch material at the level of said opening and a protective hood is provided at the closed end of each pouch.

Other aspects, objectives and advantages of the present invention will become more apparent to the reader of the following detailed description of a preferred form for construction of the invention as a non-limiting illustrative example.

BRIEF DESCRIPTION OF THE DRAWING

FIG. 5 is a diagrammatic perspective view of an alternate embodiment of the invention.

DESCRIPTION OF THE INVENTION

Figure 1:
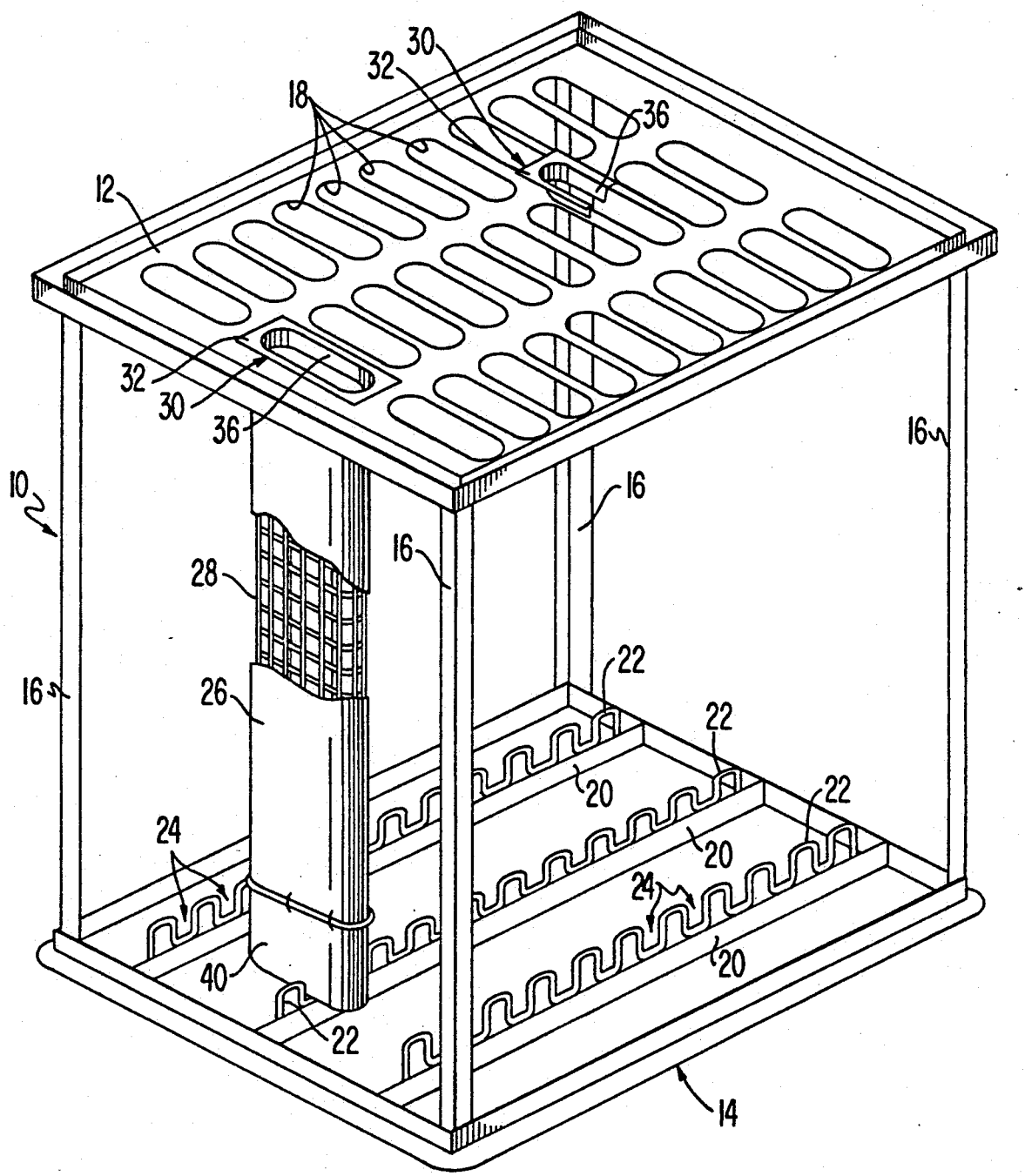
FIG. 1 is a perspective view of a cartridge filter assembly according to the present invention, certain parts of which have been omitted.

In the figures, identical or similar elements or parts are designated by the same reference numbers. Also, for reasons of clarity, a certain number of elements have been omitted from FIG. 1.

A cartridge filter according to the present invention contains a framework 10, for example a metallic framework, containing an essentially rectangular plate 12 at one end and a framework 14 at the opposite end with substantially the same dimensions as plate 12. Mountings 16 extend between the corners of plate 12 and those of framework 14. This thus defines a parallelopiped shaped cartridge suitable to be housed in immovable fashion.

Plate 12 contains a network of openings 18 which are all of identical shape, and in the present example, are arranged in a regular pattern of lines and columns. In this layout, the openings are of oblong shape, and contain two large parallel rectilinear faces and two semicircular ends. In the present example, there are thirty openings arranged in three rows and ten columns.

Between the branches of framework 16, which extend parallel to the large axis of the openings, cross pieces 20 are provided in a number equal to the number of rows of openings (three in this case). Each cross piece is designed as a cradle support with respect to each opening, whose use will be described later.

In the present example, the cradle supports are defined by means of a coiled rigid metallic wire 22, whose loop size is equal to the spacing of openings 18 in each row. Wire 22 is attached to the interior edge of each cross-piece 20. The successive indentations of each rigid wire 22, in a general "U" shape, define cradle supports 24.

The structure described above is designed to receive a group of individual filtration pouches 26 (for which a single pouch is represented on FIG. 1 for reasons of clarity). Each pouch is present in the form of an elongated sleeve which is closed at one of its ends, for example by stitching, and open at the other end. Each pouch receives an interior frame 28, constructed for example of a metal gridwork, whose cross-section is oblong in shape and similar to the shape of each opening 18. On the side of the closed end of the pouch, frame 28 is also closed, while it is open on the side of the open end of the pouch.

Each pouch 26 and its associated interior frame 28 are attached on the side of the open end to platen 30. One such platen is represented as partially withdrawn in FIG. 1, to the right of an associated opening 18. This platen 30 is constituted by a rectangular plate 32, for example of metal, whose dimensions preferably are slightly smaller than the size of openings 18 in the rows and columns. An opening 34 is provided at the center of each plate 32, with a similar shape but slightly smaller dimensions that those of openings 18, and the collar 36 extends toward the interior around the entire circumference of opening 34. It is preferred that collar 36 is slightly widened toward the opening of the plate. Collar 36 is provided with a sealing element, advantageously constructed in the form of a layer 38 of rubber or analogous means attached to the exterior face of collar 36.

Finally, it is advantageous to provide a protective hood at the exterior on the side of the closed end of each pouch 26, which corresponds exactly to the shape of the end of pouch 26 over a specified length. This hood advantageously can be constructed of plastic material.

The placement into position of a filtering pouch 26 on framework 10 is accomplished by introducing frame 28 into the interior of the pouch, by placing protective hood 40 on the closed end, then attaching the open end of pouch 26 around collar 36 and sealing element 38.

When the material used to construct filtering pouches 26 is elastic, the sizing of the various elements is selected so that a certain tension is created in the pouch during this operation, which is sufficient to ensure the secure connection between the pouch and platen 30.

Then the assemblage thus obtained may be introduced into the interior space of framework 10 through one of openings 18, with an essentially perpendicular orientation to the plane of plate 12.

At the end of this placement into position, hood 40 protecting the closed end of pouch 26 and frame 28 is engaged in an associated cradle support 24 in order to thus immobilize that end. Hood 40 has the primary goal of avoiding any friction or analogous effect between the material of pouch 26 at its closed end and cradle support 24 in order to eliminate any risk of wear or tearing of the filtering material.

It is to be noted that, owing to the oblong cross-section of the filtration pouches, it is sufficient to hold the bottom ends thereof in a direction along the minor axis of said cross-section. This leads to a very simple and effective construction for cradles 24.

In addition, at the end of this placement into position, platen 30 is placed in the vicinity of plate 12, and it may possibly be attached there by any appropriate means. At the end of the placement into position, the positioning of the platen with respect to the plate must be such that the filtering material of pouch 26 is pinched with sufficient firmness between sealing element 38 and the edge of opening 18.

Optionally the sealing connection of pouch 26 on platen 30 is reinforced or ensured by exerting an appropriate force on the platen from the exterior of the cartridge such that collar 36, sealing element 38, and the material of pouch 26 are simultaneously engaged by force from the exterior over a substantial distance in opening 16. The elastic material of element 38, expanding after its passage into opening 18, ensures a very firm assemblage. It must be noted that such a solution advantageously allows not only the ensurance of the firm and sealed connection of pouch 26 and platen 30, but also firm attachment of platen 30 on plate 12.

Figure 2:
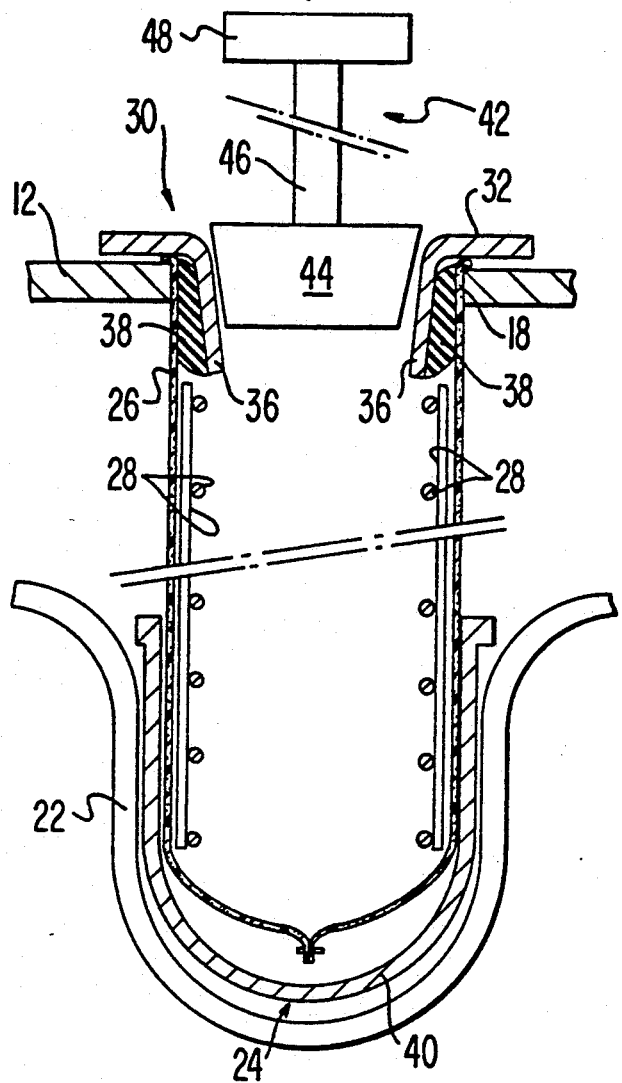
FIG. 2 is a longitudinal cross-sectional view of a portion of the filter from FIG. 1.

As illustrated in FIG. 2, this push for assembly by force may be accomplished by means of special tool 42 containing a pushing element 44, whose shape corresponds substantially to that of the space delimited by collar 36, a sleeve 46, and a handle 48, in order to exert manual force. After placement into position of the pouch and the platen, tool 42 is withdrawn.

Figure 3:
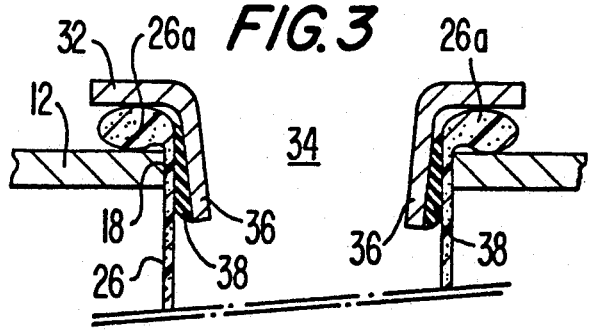
FIG. 3 is a partial cross-sectional view illustrating variation of the invention.

In another variation, illustrated schematically in FIG. 3, the open end of pouch 26 may contain a relatively thick bead or thickened flange 26a which can no longer traverse opening 18 once this end has received collar 36 and sealing element 38 inside its interior. In this case, sealing is ensured or reinforced by holding bead 26a between plate 32 and the exterior surface of plate 12, as illustrated.

Figure 4:
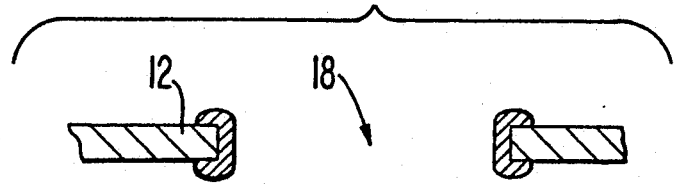
FIG. 4 is a partial cross-sectional view of a second variation of the invention.

In order to avoid any risk of wear or tearing the filtering material of pouch 26 at the level of plate 12, it is possible to provide for each opening 18 to contain an element for protection of the pouch, for example a rubber tube or analogous means, or to have a pouch of a material with rounded corners and a reduced friction coefficient, designated by the reference 18a on FIG. 4.

By preference, but not exclusively, a filtration membrane of porous polytetrafluoroethylene can be utilized as the filtering material, known under the designation of Gore-Tex ® and marketed by the applicant. Such a membrane is known for its superior filtration qualities for a given filtering surface area, and facilitates the cleaning of the filters by considerably limiting the adherence of the filtered particles. Membranes which may be useful in the invention are described in U.S. Pat. Nos. 3,953,566, 3,962,153, 4,096,227, 4,187,390, 4,902,423, and 4,478,665.

FIG. 5 illustrates an alternate embodiment of the present invention. The framework includes four lateral walls 11 extending on the four sides thereof parallel to the general direction of the pouches.

Such arrangement ensures that when the filter cartridge is cleaned or unclogged (classically by applying a strong reverse flow of gas), that the neighboring cartridges do not get polluted by the cakes of filtered particles separating from the filtering pouches.

Of course, the present invention is not limited to the embodiments described above or in the figures, but variations and modifications may be made within the scope of the invention by one skilled in the art.

In particular, individual platens 30 associated with a group of pouches or all of the pouches may be designed in the form of a single element forming a counter-plate suitable to be applied against plate 12.

Of course, it is understood that the arrangement, dimensions and material constituting the various elements described above may vary considerably without departing from the scope of the invention.

We claim:

1. A gas filtration cartridge for removable insertion into a filtration device comprising:
   (a) a self-supporting framework;
   (b) a fixed plate comprising part of the framework and provided at the top end thereof with a multiplicity of openings;
   (c) a multiplicity of spaced-apart elongated individual filtration pouches extending substantially parallel to one another within the framework from the respective openings of said plate;
   (d) means that provide for the attachment and the sealed connection of each pouch through a top open end onto an associated opening of the plate, and
   (e) cradle means for attachment provided at a bottom end of the framework and in which the bottom closed ends of the pouches rest so as to hold the pouches in their parallel relationship.

2. A cartridge according to claim 1, wherein the shape of said openings, the transverse cross-section of said pouches is essentially oblong, and the cradle means hold a pouch only along the minor axis of said oblong transverse cross-section.

3. A cartridge according to claim 2, wherein a frame is provided in the interior of each pouch for maintenance of the shape.

4. A cartridge according to claim 3, wherein the means for sealed connection for each pouch includes a platen in association with each pouch, and a collar engaged in the open end of each pouch, in each associated opening the material of the pouch in the region of its open end being held between said platen and the edge of said opening during placement into position of said platen on said plate.

5. A cartridge according to claim 4, wherein the material of the pouch in the region of its open end is held between the exterior face of said collar and the edge of said associated opening.

6. A cartridge according to claim 4, wherein said pouch contains a bead at the level of its open end which is held between a plate of said platen, widening toward the exterior with respect to the base of said collar and said plate of said framework.

7. A cartridge according to claim 5, wherein said collar of each platen includes a layer of elastically deformable material on its exterior face.

8. A cartridge according to claim 3, wherein said cradle means include a cradle support in association with each pouch in order to receive the closed end of said pouch and the associated end of said frame.

9. A cartridge according to claim 8, wherein a multiplicity of cradle supports corresponding to a multiplicity of pouches arranged in a single row comprise coiled rigid wires.

10. A cartridge of claim 1, wherein said pouches are constructed from a filtering membrane comprising porous polytetrafluoroethylene.

11. A cartridge according to claim 1, wherein the edge of each opening of said plate contains a protective element for said pouch material at the level of said opening.

12. A cartridge according to claim 1, including a protective hood at the closed end of each pouch.

13. A cartridge according to claim 1, wherein the framework includes lateral walls extending generally parallel to the filtration pouches.

* * * * *